US010200785B2

(12) United States Patent
Kurek et al.

(10) Patent No.: US 10,200,785 B2
(45) Date of Patent: Feb. 5, 2019

(54) WIRELESS POCKET TRANSMITTER, RECHARGEABLE BATTERY UNIT FOR A WIRELESS POCKET TRANSMITTER, WIRELESS MICROPHONE, RECHARGEABLE BATTERY FOR A WIRELESS MICROPHONE AND CHARGING UNIT FOR A POCKET TRANSMITTER AND/OR A MICROPHONE

(71) Applicant: Sennheiser electronic GmbH & Co. KG, Wedemark (DE)

(72) Inventors: Peter Kurek, Burgwedel (DE); Ulf Linnemann, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 0 days.

(21) Appl. No.: 15/504,852

(22) PCT Filed: Aug. 31, 2015

(86) PCT No.: PCT/EP2015/069851
§ 371 (c)(1),
(2) Date: Feb. 17, 2017

(87) PCT Pub. No.: WO2016/030540
PCT Pub. Date: Mar. 3, 2016

(65) Prior Publication Data
US 2017/0303036 A1    Oct. 19, 2017

(30) Foreign Application Priority Data
Aug. 29, 2014    (DE) .................. 10 2014 217 347

(51) Int. Cl.
*H04R 3/00*    (2006.01)
*G10H 1/00*    (2006.01)
(Continued)

(52) U.S. Cl.
CPC ............. *H04R 3/00* (2013.01); *G10H 1/0083* (2013.01); *H01M 2/1066* (2013.01);
(Continued)

(58) Field of Classification Search
CPC ... H04R 3/00; H04R 2420/07; H01M 2/1066; H01M 2220/30; H02J 7/0027; H02J 7/0042; H02J 7/0045; H04B 1/034; H04B 1/3883; G10H 1/0083; H04M 2001/0204
USPC .................................. 455/572, 575.1, 575.4
See application file for complete search history.

(56) References Cited

U.S. PATENT DOCUMENTS 5,242,767 A * 9/1993 Roback ............... H01M 2/1022
                                                    320/114
5,660,945 A * 8/1997 McCormick ........ H01M 2/1022
                                                    429/123
(Continued)

FOREIGN PATENT DOCUMENTS

DE    201 06 415    9/2001
EP    0 530 719    3/1993
(Continued)

OTHER PUBLICATIONS

International Search Report for Application No. PCT/EP2015/069851 dated Feb. 3, 2016.

*Primary Examiner* — Jason R Kurr
(74) *Attorney, Agent, or Firm* — Haug Partners LLP

(57) ABSTRACT

A wireless pocket transmitter having a rear side, a front side and a receiving compartment for a rechargeable battery. The receiving compartment has a rear wall which at least partially forms a part of the rear side, two side surfaces and a connecting portion with electrical contacts. The two side surfaces are each coupled with a first side to the rear wall and with a first end to the connecting portion. The second ends of the side surfaces each have a respective guide for the battery. The guides do not extend along the entire length of the side surface and the guide has two projections and a passage therebetween.

13 Claims, 23 Drawing Sheets

(51) Int. Cl.
*H04B 1/034* (2006.01)
*H04B 1/3883* (2015.01)
*H01M 2/10* (2006.01)
*H02J 7/00* (2006.01)

(52) U.S. Cl.
CPC .......... *H02J 7/0027* (2013.01); *H02J 7/0045* (2013.01); *H04B 1/034* (2013.01); *H04B 1/3883* (2013.01); *H01M 2220/30* (2013.01); *H04R 2420/07* (2013.01)

(56) References Cited

U.S. PATENT DOCUMENTS

| | | | | |
|---|---|---|---|---|
| 5,669,069 | A * | 9/1997 | Rautila ................ | G06K 7/0021 |
| | | | | 379/433.08 |
| 8,586,225 | B1 * | 11/2013 | Bausch ............... | H01M 2/1066 |
| | | | | 429/163 |
| 2001/0007823 | A1 * | 7/2001 | Lee ..................... | H04B 1/3883 |
| | | | | 455/573 |
| 2001/0044331 | A1 * | 11/2001 | Miyoshi ............... | H04B 1/3883 |
| | | | | 455/572 |
| 2002/0160728 | A1 * | 10/2002 | Morita ................ | H01M 2/1066 |
| | | | | 455/575.1 |
| 2004/0152496 | A1 * | 8/2004 | Pan ..................... | H04M 1/0262 |
| | | | | 455/575.1 |
| 2015/0326265 | A1 * | 11/2015 | Yang ..................... | H02J 7/02 |
| | | | | 455/573 |

FOREIGN PATENT DOCUMENTS

| | | |
|---|---|---|
| EP | 0 685 894 | 12/1995 |
| EP | 2 620 998 | 7/2013 |
| WO | WO 92/10004 | 6/1992 |

* cited by examiner

WIRELESS POCKET TRANSMITTER, RECHARGEABLE BATTERY UNIT FOR A WIRELESS POCKET TRANSMITTER, WIRELESS MICROPHONE, RECHARGEABLE BATTERY FOR A WIRELESS MICROPHONE AND CHARGING UNIT FOR A POCKET TRANSMITTER AND/OR A MICROPHONE

The present application claims priority from International Patent Application No. PCT/EP2015/069851 filed on Aug. 31, 2015, which claims priority from German Patent Application No. 10 2014 217 347.7 filed on Aug. 29, 2014, the disclosures of which are incorporated herein by reference in their entirety.

FIELD OF THE INVENTION

It is noted that citation or identification of any document in this application is not an admission that such document is available as prior art to the present invention.

The present invention concerns a wireless pocket transmitter, a rechargeable battery unit for a wireless pocket transmitter, a wireless microphone, a rechargeable battery for a wireless microphone and a charging unit for a pocket transmitter and/or a microphone.

Mobile electroacoustic devices (like for example microphones and wireless pocket transmitters) have long been known and have a rechargeable power supply.

In the German patent application from which priority is claimed the German Patent and Trade Mark Office searched the following documents: DE 72 45 574 U, EP 0 685 894 A1, EP 0 530 719 A1 and DE 201 06 415 U1.

SUMMARY OF THE INVENTION

An object of the present invention is to provide electroacoustic devices which permit simplified exchange of the power supply.

Thus there is provided a wireless pocket transmitter having a rear side, a front side, an underside and a receiving compartment for a rechargeable battery. The receiving compartment has a rear wall which at least partially forms a part of the rear side, two side surfaces and a connecting portion with electrical contacts. The two side surfaces are each coupled with a first side to the rear wall and with a first end to the connecting portion. The second ends of the side surfaces each have a respective guide for the battery. The guides do not extend along the entire length of the side surface and the guide has two projections and a passage therebetween.

According to an aspect of the present invention the side surfaces have at their first ends a respective ramp.

According to a further aspect of the present invention the side surfaces each have a second side which is opposite to the first side and serves as a support surface for the rechargeable battery.

According to a further aspect of the present invention the connecting portion has a projection extending substantially parallel to the rear wall.

According to a further aspect of the present invention the rear wall of the pocket transmitter has a projection.

The invention also concerns a rechargeable battery unit for a wireless pocket transmitter. The rechargeable battery unit has a front side, a rear side, a left and a right side, a top side and an underside. A projection is also provided in the region of the underside and along the rear side and the left and right sides. A respective recess is provided at the right and left sides towards the rear side. A projection is provided in the two recesses. The projection is connected with an end to the peripherally extending projection and extends partially along the recess.

According to an aspect of the present invention the rechargeable battery unit has an electrical charging contact unit and a USB charging port on the underside.

According to a further aspect of the present invention the electrical contact unit has six contacts at the top side. The electrical charging contact unit has six charging contacts.

The invention also concerns the use of a rechargeable battery unit as described above in a wireless pocket transmitter as described above.

DETAILED DESCRIPTION OF EMBODIMENTS

Figure 1A:
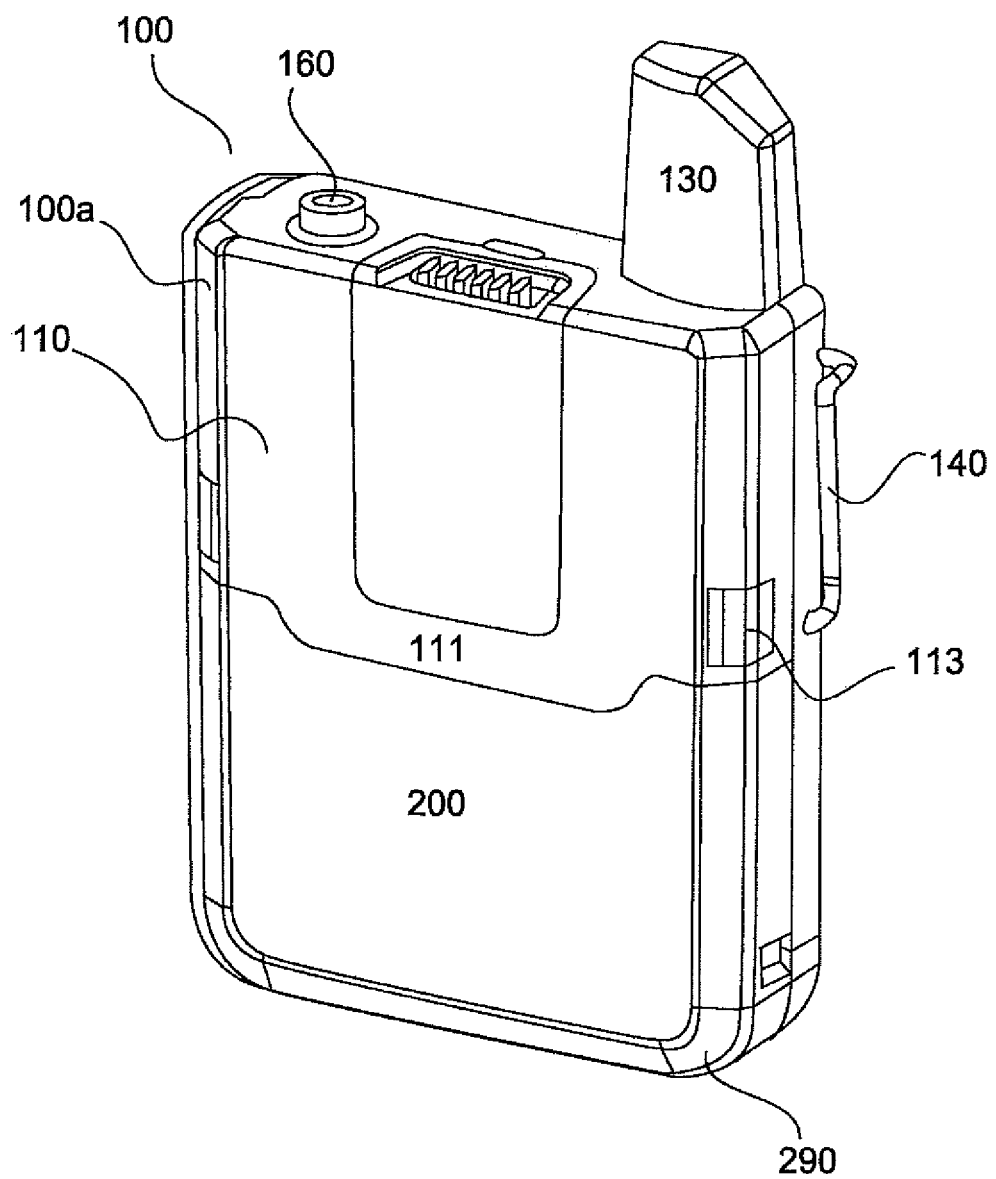
FIGS. 1A-1J show various views of a wireless pocket transmitter according to a first embodiment.
Figure 1B:
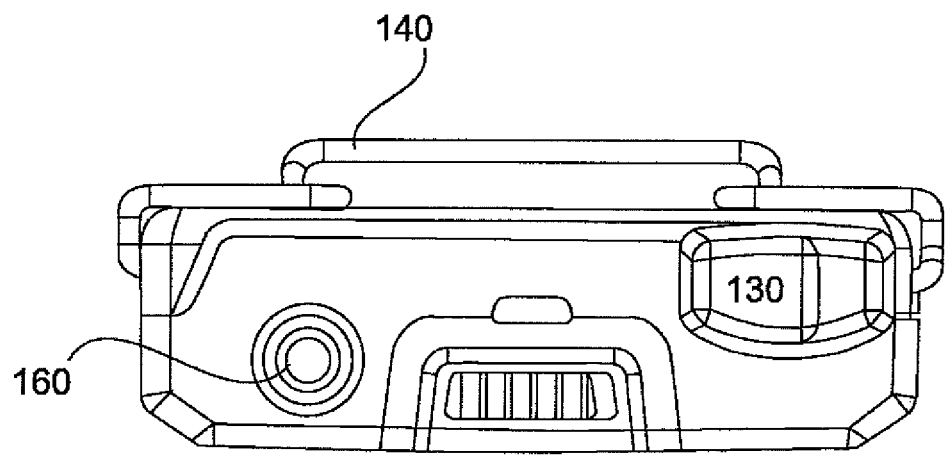
Figure 1G:
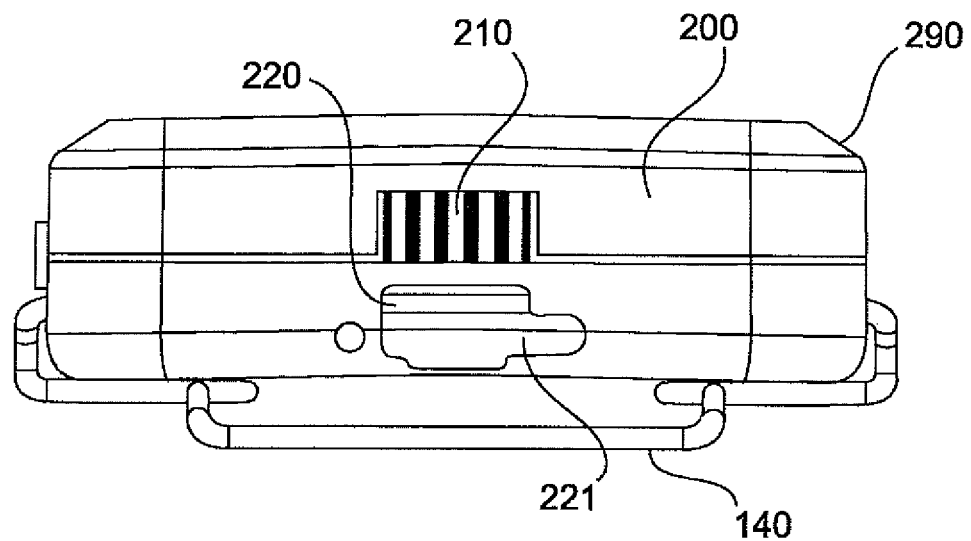
Figure 1C:
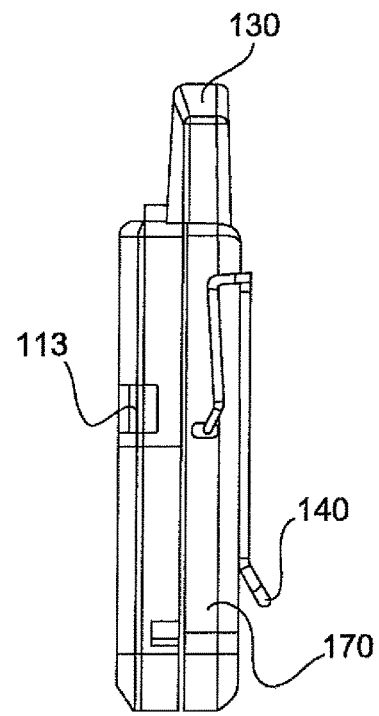
Figure 1D:
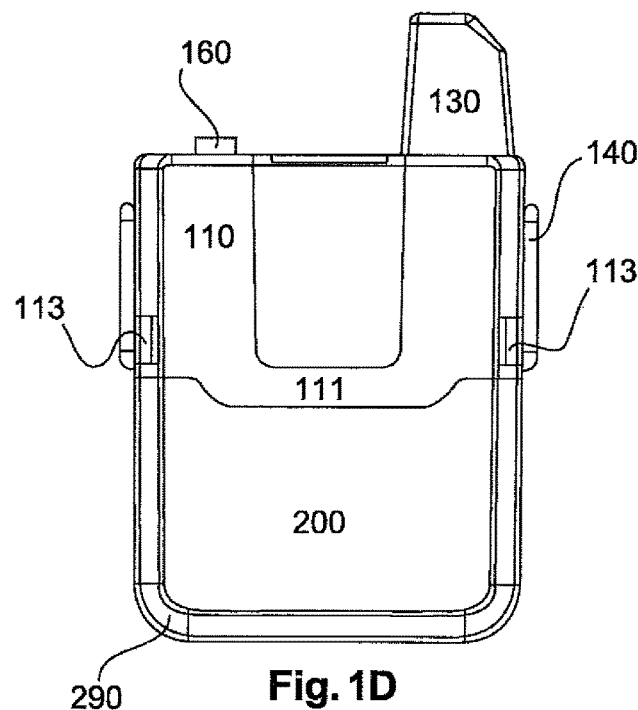
Figure 1E:
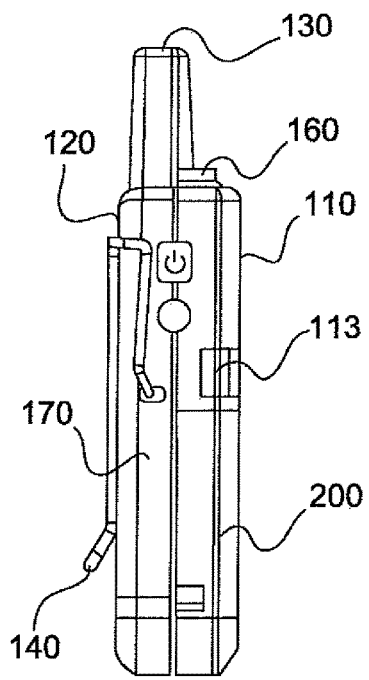
Figure 1F:
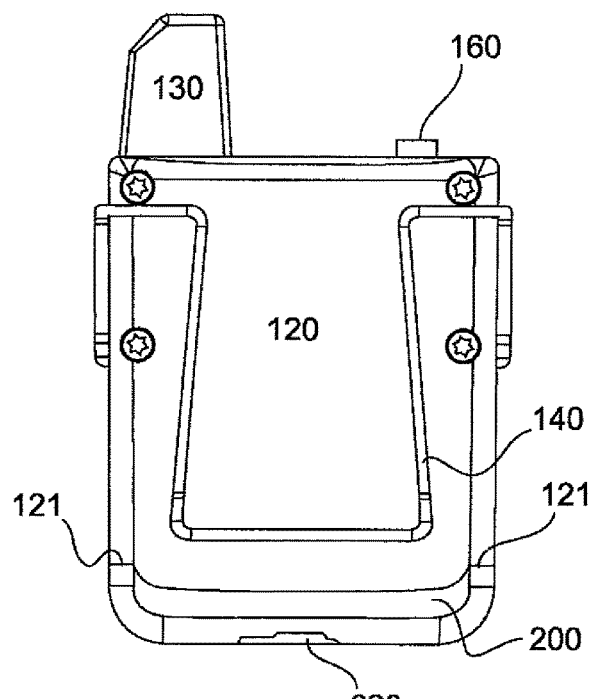

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

A wireless pocket transmitter according to the invention can represent a microphone wireless pocket transmitter or a wireless guitar pocket transmitter. A pocket transmitter has an input, by way of which the pocket transmitter receives an audio signal for example from a microphone or a guitar and wirelessly transmits that signal.

A rechargeable battery, accumulator or a rechargeable battery unit according to the invention represents a rechargeable storage means for electrical energy. The rechargeable battery, the accumulator or the rechargeable battery unit serves for example for the power supply of the wireless pocket transmitter.

FIGS. 1A-1J show various views of a wireless pocket transmitter according to a first embodiment. The wireless pocket transmitter 100 has a jack or an audio input 160 for example for a microphone or a guitar and converts the audio signals received by way of the jack 160 into wireless audio signals which can then be wirelessly transmitted. The pocket transmitter 100 has a front side 110 having a projection 111, with a locking means 113 for a rechargeable battery 200, and a rear side 120 having a projection 122. The pocket transmitter 100 also has an antenna 130 for wirelessly transmitting an audio signal to be transmitted, a fixing bow 140, a top side 150 having a jack 160 for example for a microphone, a side wall 170 and a guide 171 for a rechargeable battery 200. The wireless pocket transmitter 100 also has six electrical contacts 100, 181-186.

The wireless pocket transmitter 100 has a receiving compartment 101 for receiving a rechargeable battery 200. The receiving compartment 101 has a rear wall 101*a* which is at least partially part of the rear side 120 of the pocket transmitter. The receiving compartment 101 also has two side surfaces 101*c* and a connecting portion 101*b* with electrical contacts 180, 181-186. The two side surfaces 101*c* are respectively coupled with a side 101*d* to the rear wall 101*a*. The two side surfaces 101*c* are coupled with a first end to the connecting portion 101*b*. The second ends of the side surfaces 101*c* each have a respective guide 171, 172 for the rechargeable battery 200. The guides 171, 172 do not extend along the entire length of the side surface 101*c*. The guides 171, 172 have two projections 171 and a passage 172 between the two projections.

The projection 122 on the rear side 120 extends beyond the ends of the side walls 170 and serves as a support or insertion or introduction aid for the rechargeable battery 200. The end to be introduced of the rechargeable battery 200 can be placed on the projection 122 and the rechargeable battery is oriented in that way and can be pushed into the receiving compartment 101.

FIGS. 2A-2H show various views of a rechargeable battery for a pocket transmitter as shown in FIGS. 1A-1G according to a second embodiment. The rechargeable battery 200 for the wireless pocket transmitter has a front side 200*a*, a rear side 200*b*, a top side 200*c*, an underside 200*d*, a left side 200*e* and a right side 200*f*. The rechargeable battery 200 also has five electrical contacts 210, 211-215 at its underside 200*d*. In addition to the electrical contacts 210 the rechargeable battery has a micro-USB port 220 with a cover 221 on the underside 200*d*. In addition the rechargeable battery 200 has six electrical contacts 230, 231-236 at its top side 200*c*. Two recesses 240 for latching hooks 174 of the pocket transmitter 100 are provided at the top side 200*c*. A respective projection 250 is provided at the left and right sides 200*e*, 200*f*. A respective recess 260 is further provided at the right and the left sides 200*f*, 200*e*. The recess 260 extends from the step 282 along the remaining length of the left and right sides 200*e*, 200*f*. A recess 270 is provided at the front side 200*a* of the rechargeable battery 200, more specifically in the upper region. The recess 270 can be in the form of a trough-shaped recess 270. That recess 270 can cooperate with the projection 111 on the front side 110 of the pocket transmitter 100 in such a way that in the installed condition of the rechargeable battery 200 the projection 111 extends into the recess 270 and thus prevents the rechargeable battery 200 being able to tip forwardly or outwardly. That can thus ensure an anti-tipping effect.

A projection 280 can be provided on the rear side 200*b* of the rechargeable battery 200, which projection can in turn have a (trough-shaped) recess 281 in the lower region. That recess can cooperate with the projection 122 on the rear side 120 of the pocket transmitter 100. The projection 280 extends on the rear side 200*b* and the right and left sides 200*e*, 200*f*. The projection 250 is coupled at its first end to the projection 280.

At its top side 200*c* the rechargeable battery has six contacts 231-236. Provided at the underside 200*d* of the rechargeable battery are five contacts 211-215 and a USB (micro) port 220. A monitoring LED 222 can also be provided, which for example lights up when the rechargeable battery is being charged by way of the USB port.

Provided at the side surfaces 200*f*, 200*e* in the lower region is a respective recess 290 which can cooperate with latching hooks of a charging station to hold the pocket transmitter 100 firmly in the charging station. On its front side 200*a* the rechargeable battery 200 has a bevel 291 which extends at the two sides 200*e*, 200*f* and at the underside 200*b*. A projection 280 having a trough-shaped recess 281 is provided at the rear side 200*b* in the lower region. A respective projection 250 is provided at the two sides 200*e*, 200*f* in the lower region.

The rechargeable battery is for example 4.1 cm high and the projection 250 is for example 1.1 cm long. The projection 250 can be for example between 10% and 80% of the length of the rechargeable battery or the length of the recess 260. That leads to an improvement in the fit of the rechargeable battery 200 in the pocket transmitter.

At its upper end the projection has a bevel 251. At its top side 200*c* at left and right there are two recesses 240 which cooperate with latching hooks 174 on the pocket transmitter 100 so that the rechargeable battery 200 is securely held. The trough-shaped recess 281 is provided at the rear side 200*b* in the projection 280 in the rearward lower end 281. A step 282 is provided at the left and right sides. The step 282 is present both in respect of the projection 250 and also the inner side surfaces 260. The recess 290 is open towards the element or recess 260. The recess 290 is thus only closed when the rechargeable battery is fitted into the pocket transmitter.

Figure 1H:
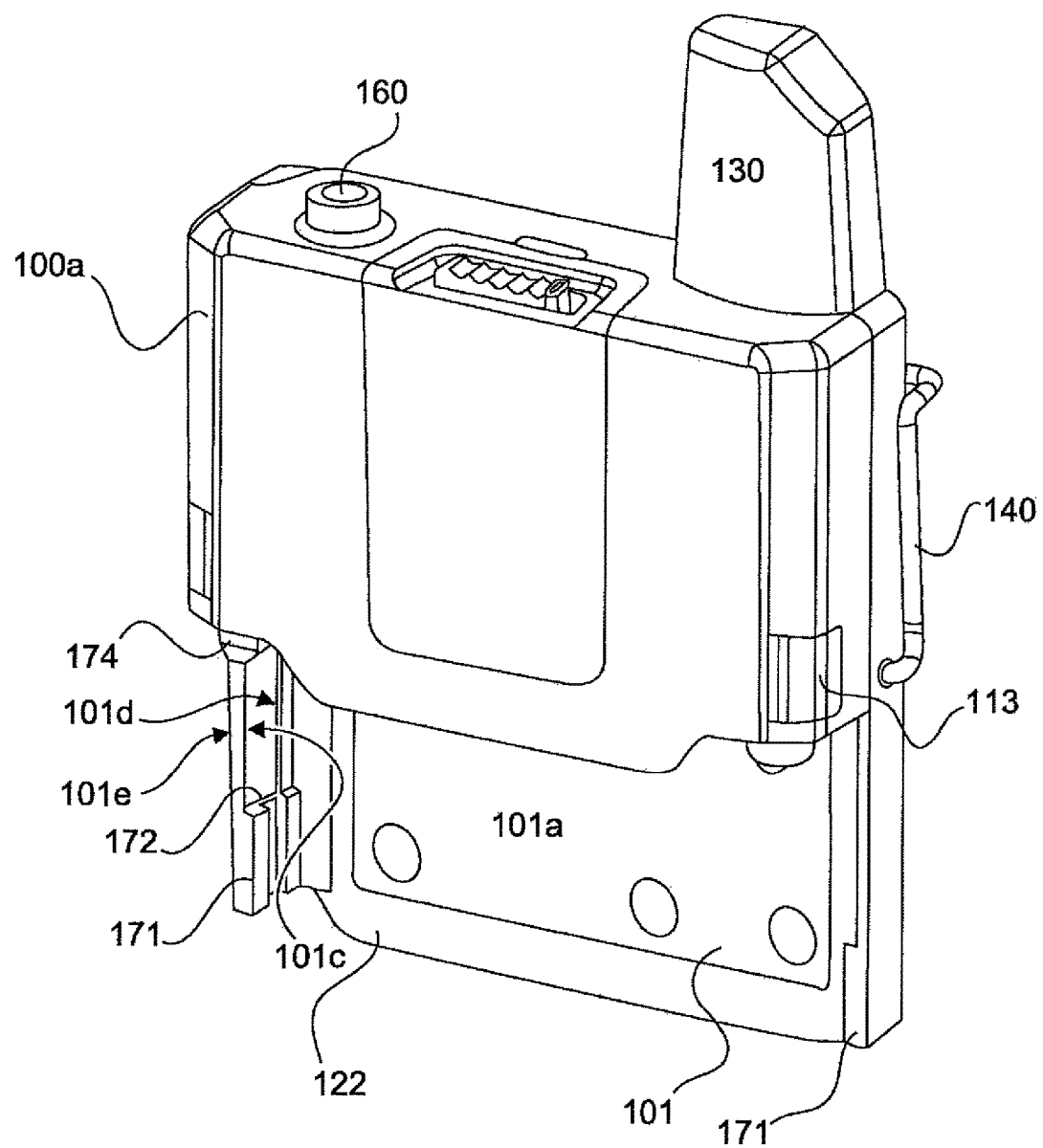
Figure 1I:
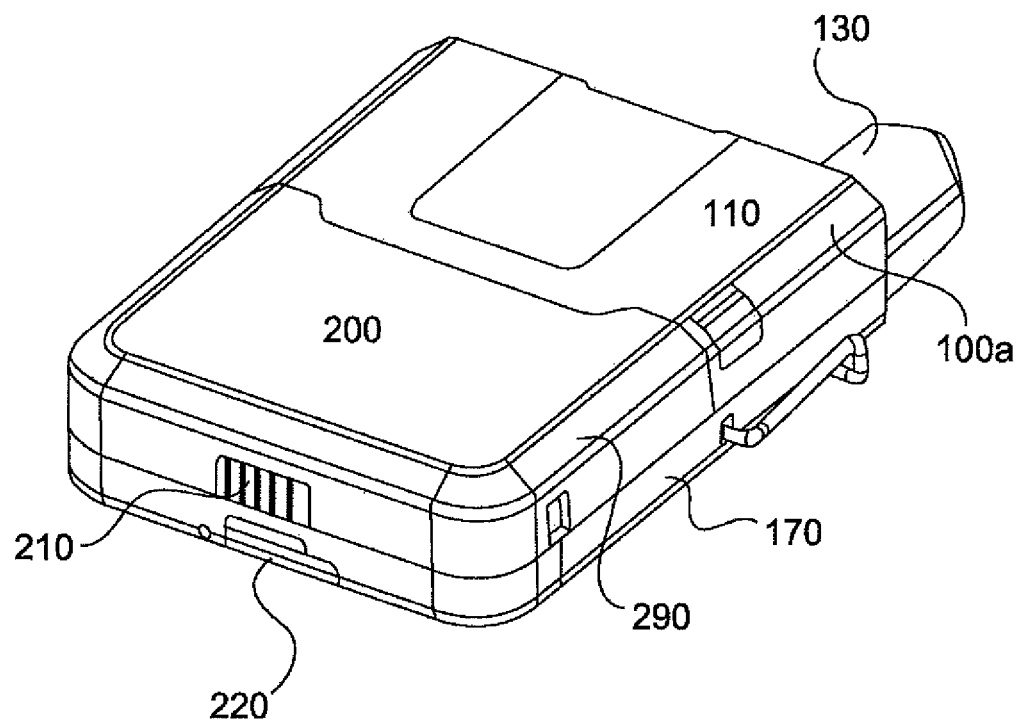
Figure 1:
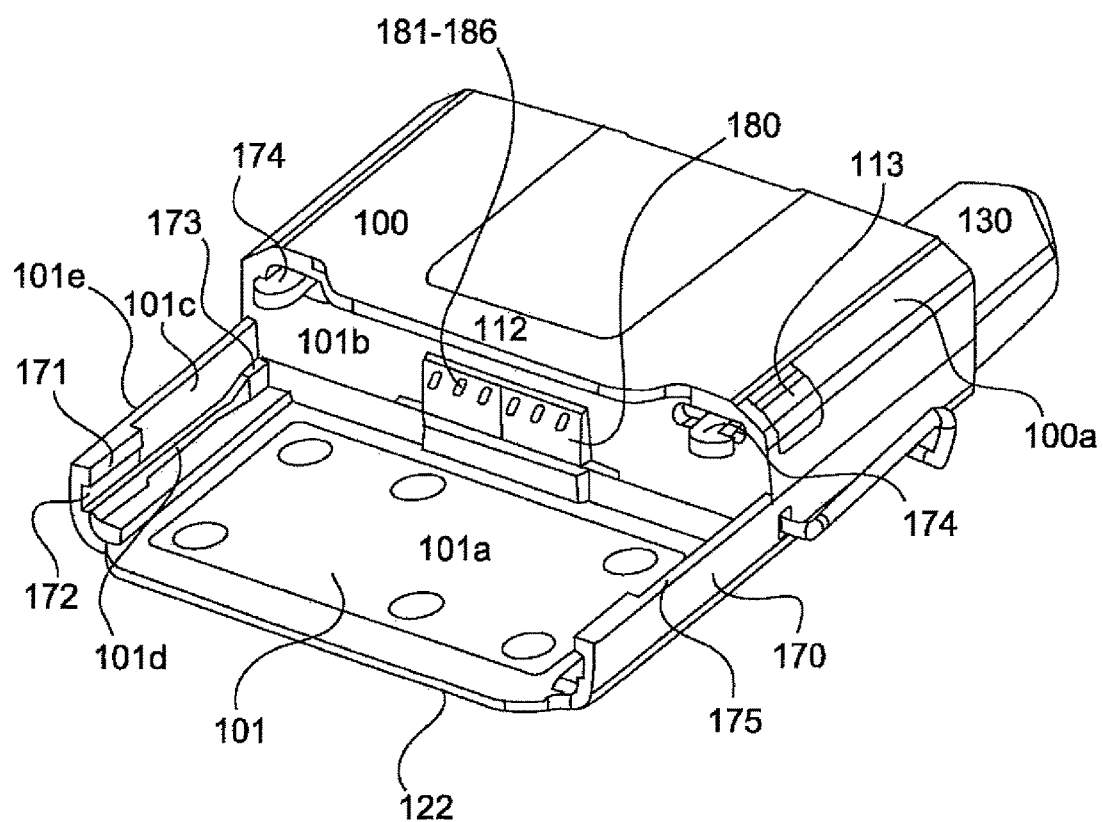
Figure 2A:
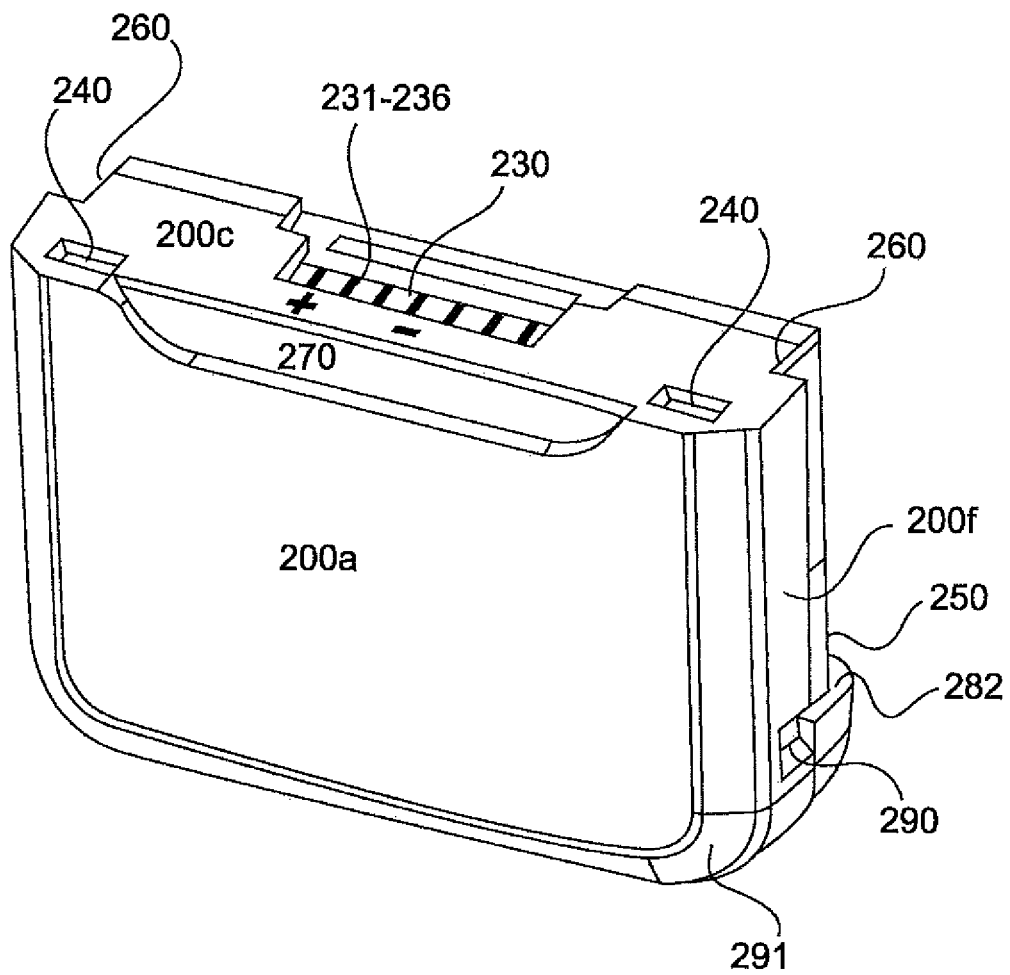
FIGS. 2A-2H show various views of a rechargeable battery for a pocket transmitter as shown in FIGS. 1A-1G according to a second embodiment.
Figure 2B:
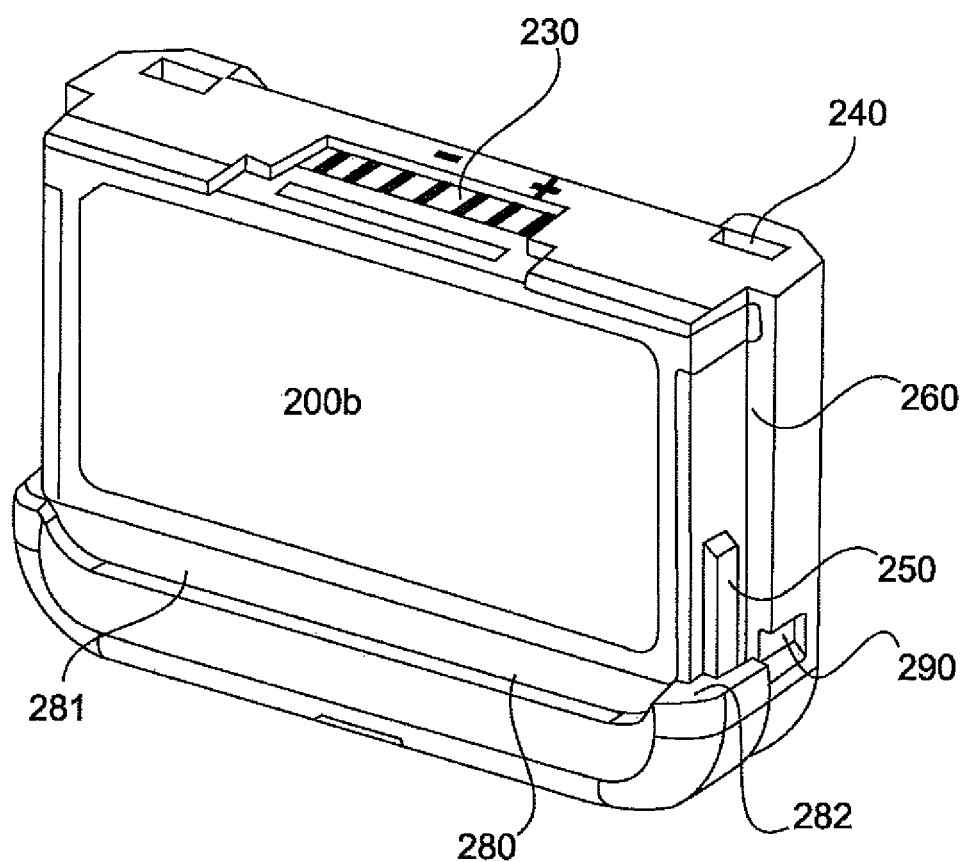
Figure 2C:
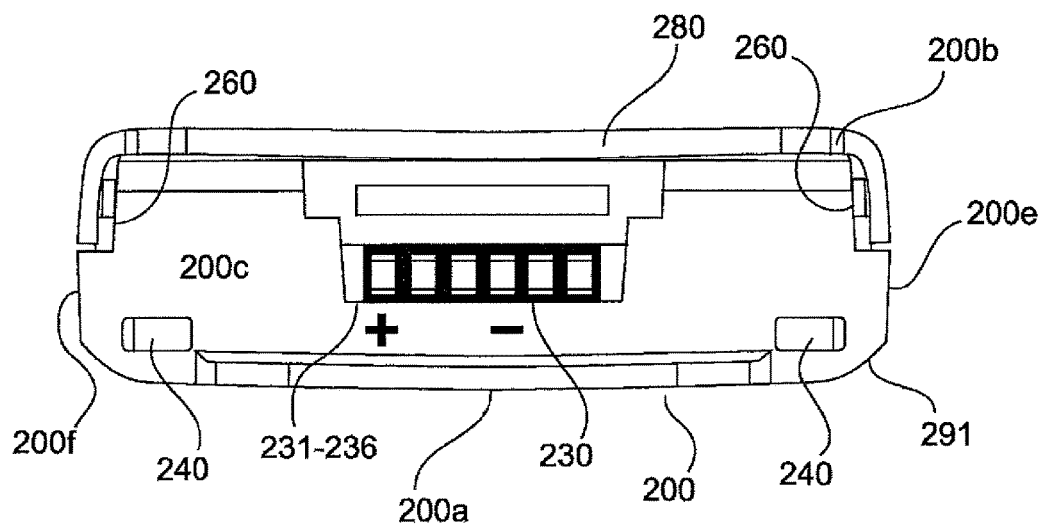
Figure 2D:
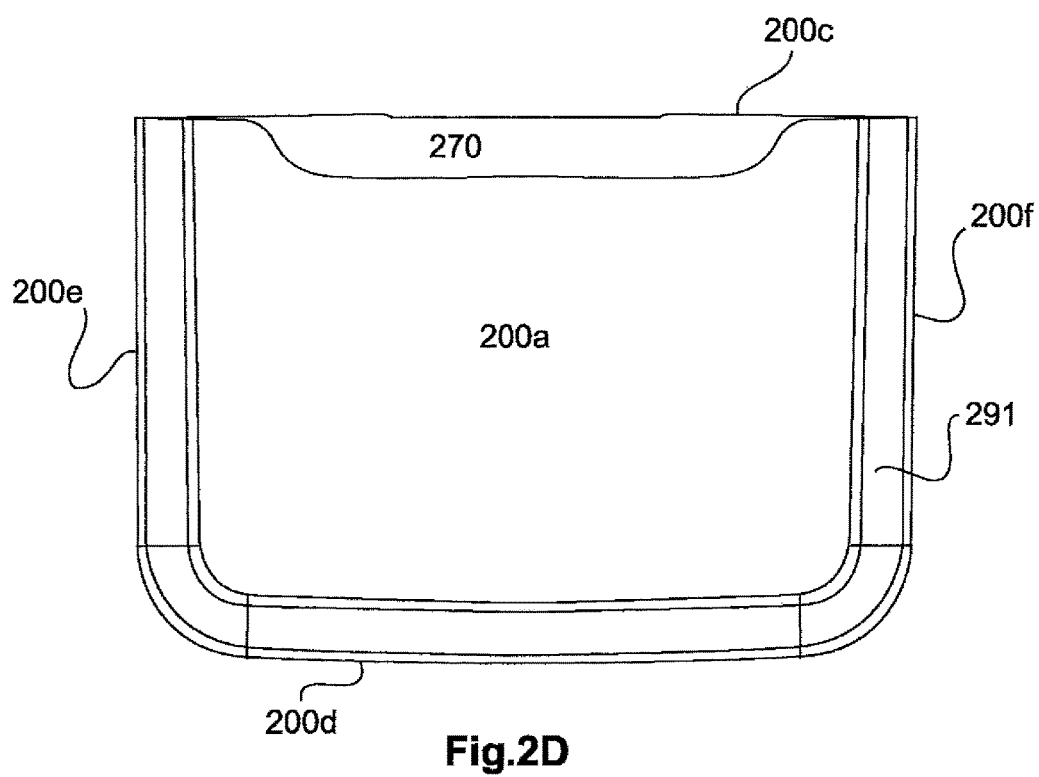
Figure 2E:
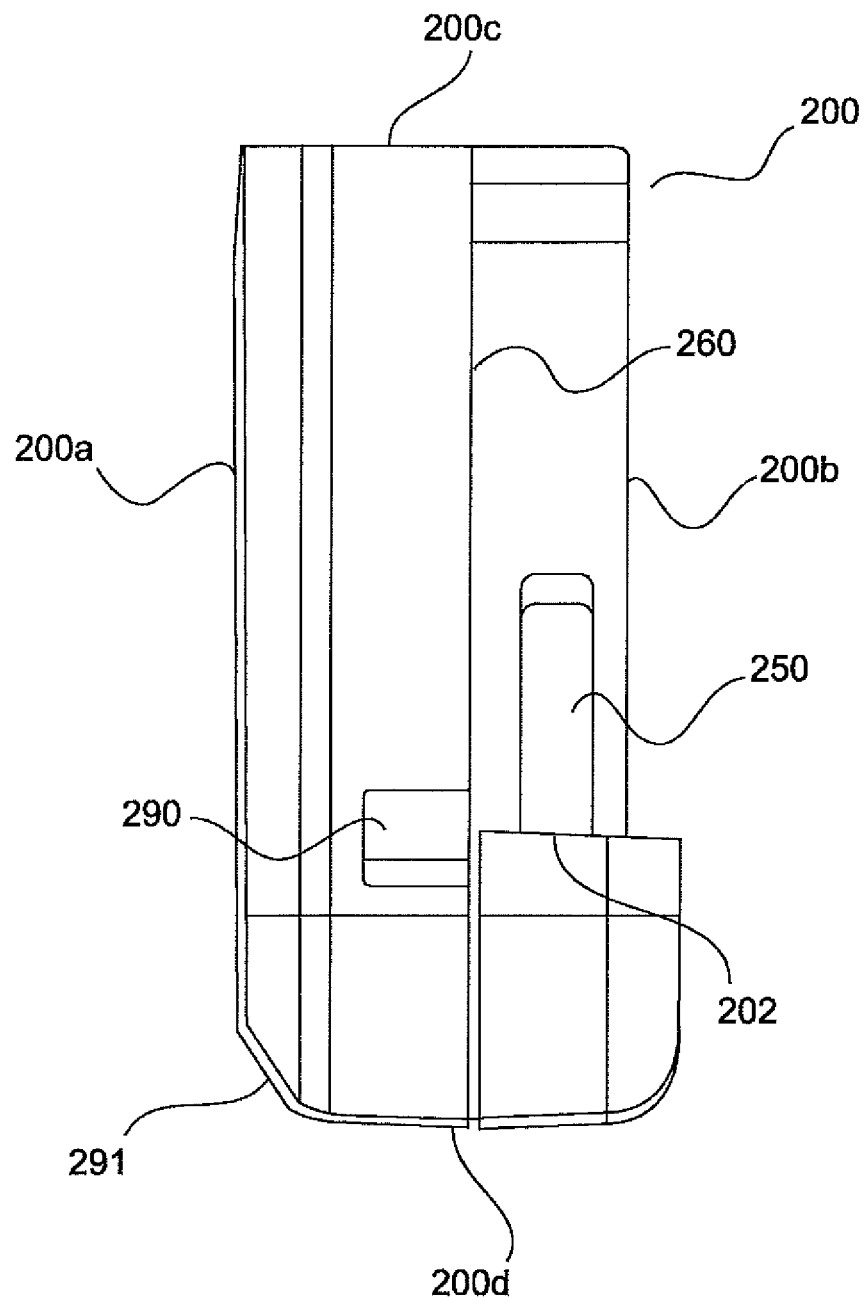
Figure 2F:
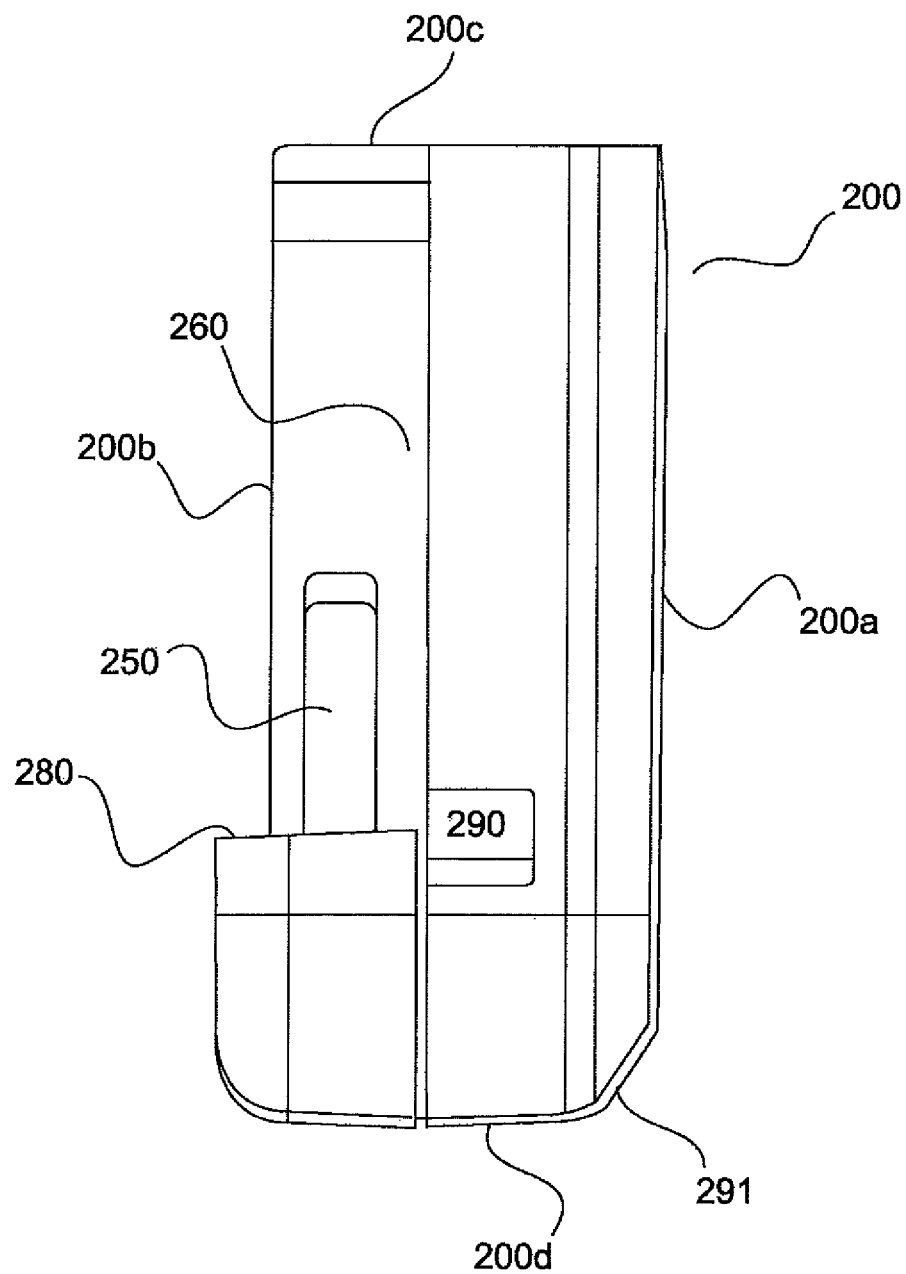
Figure 2G:
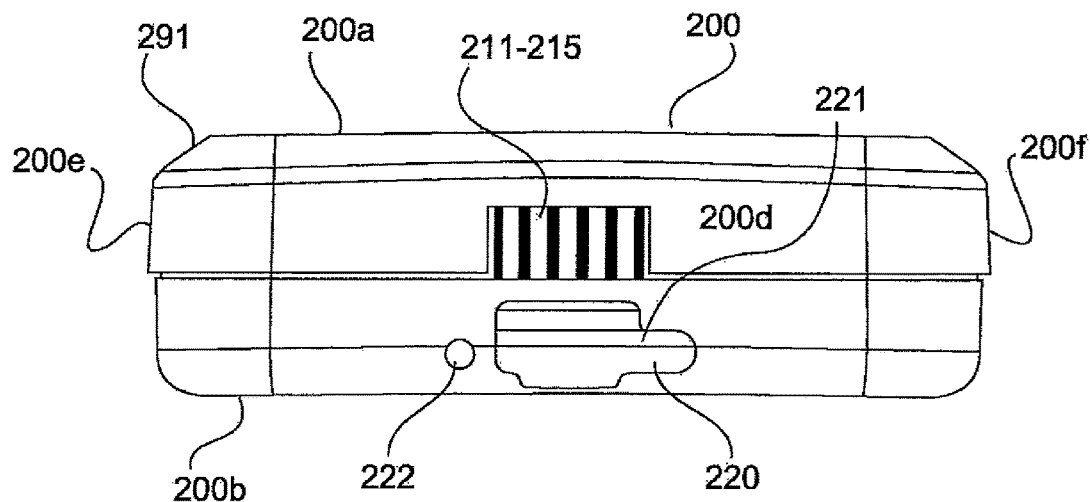
Figure 2H:
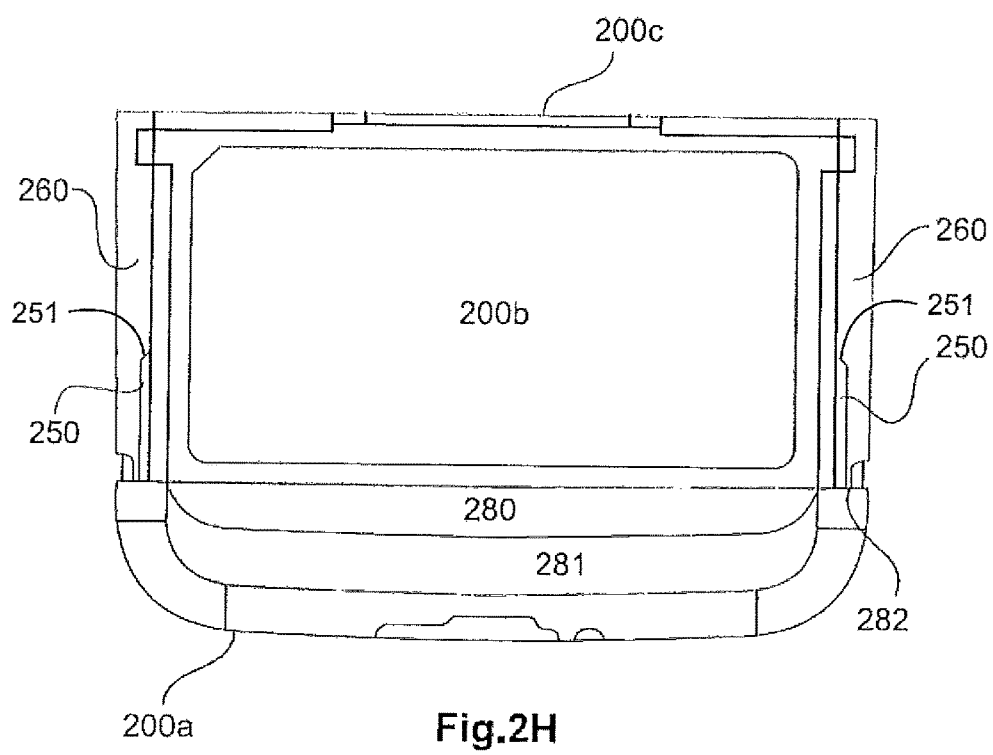
Figure 3A:
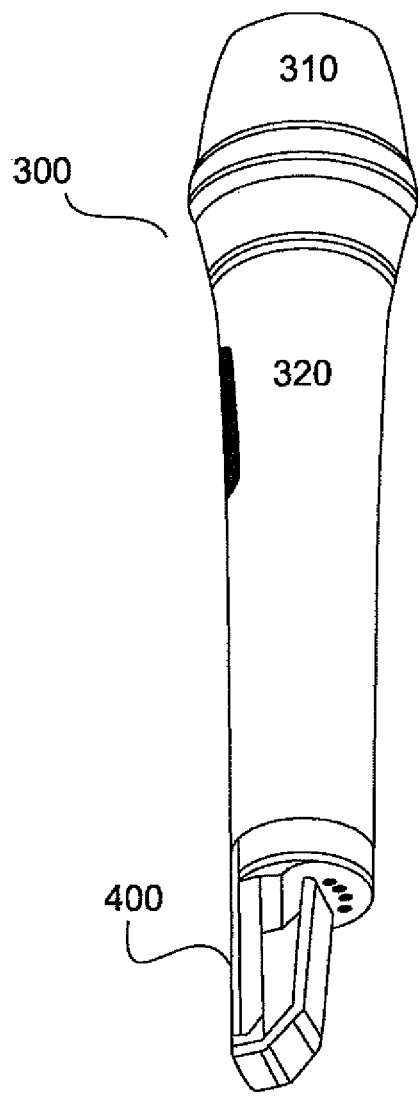
FIGS. 3A-3E show various views of a wireless microphone according to a third embodiment.
Figure 3B:
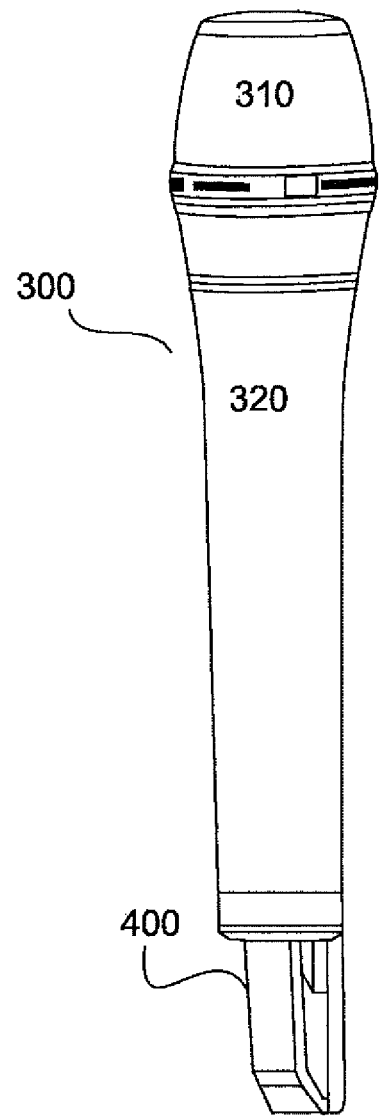
Figure 3C:
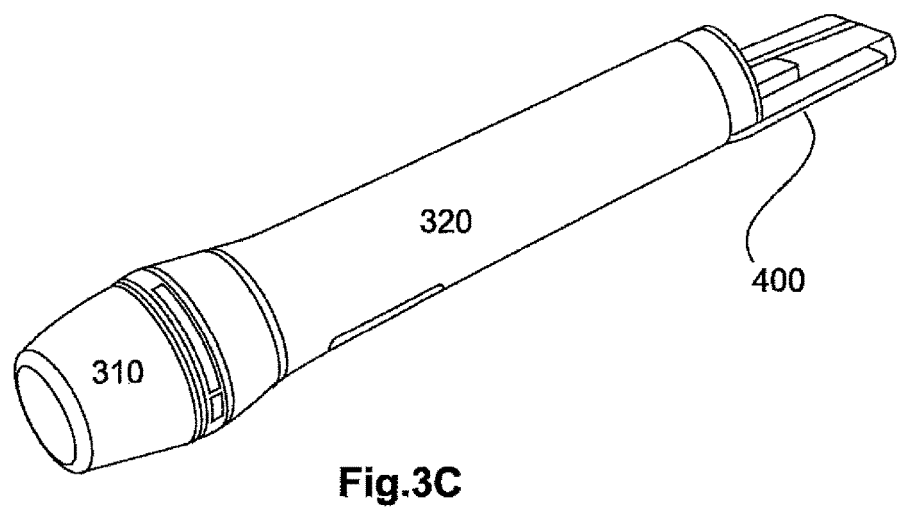
Figure 3D:
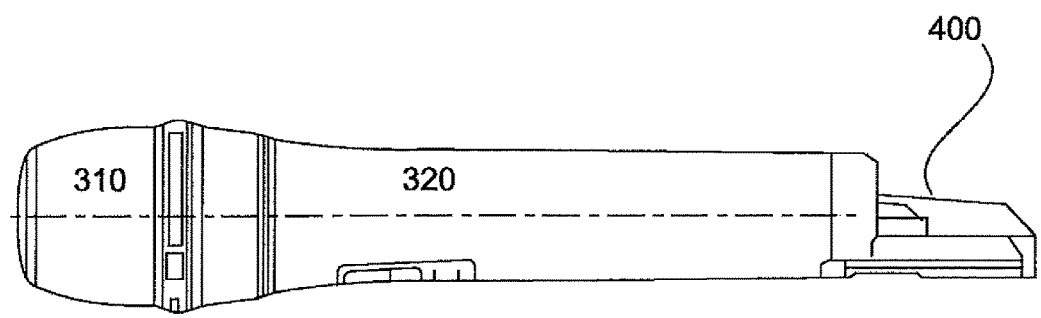
Figure 3E:
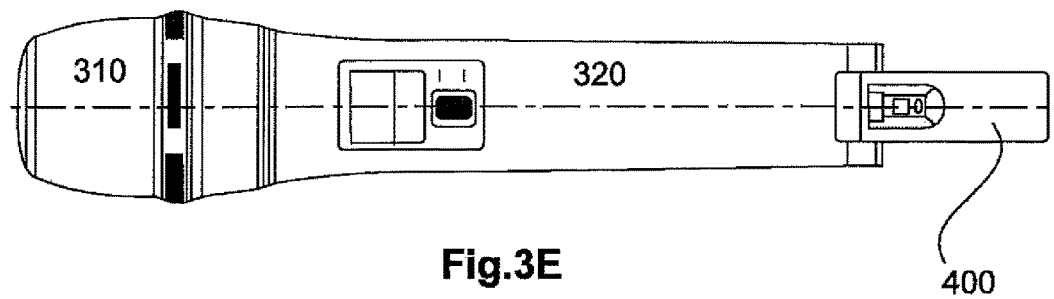
Figure 4A:
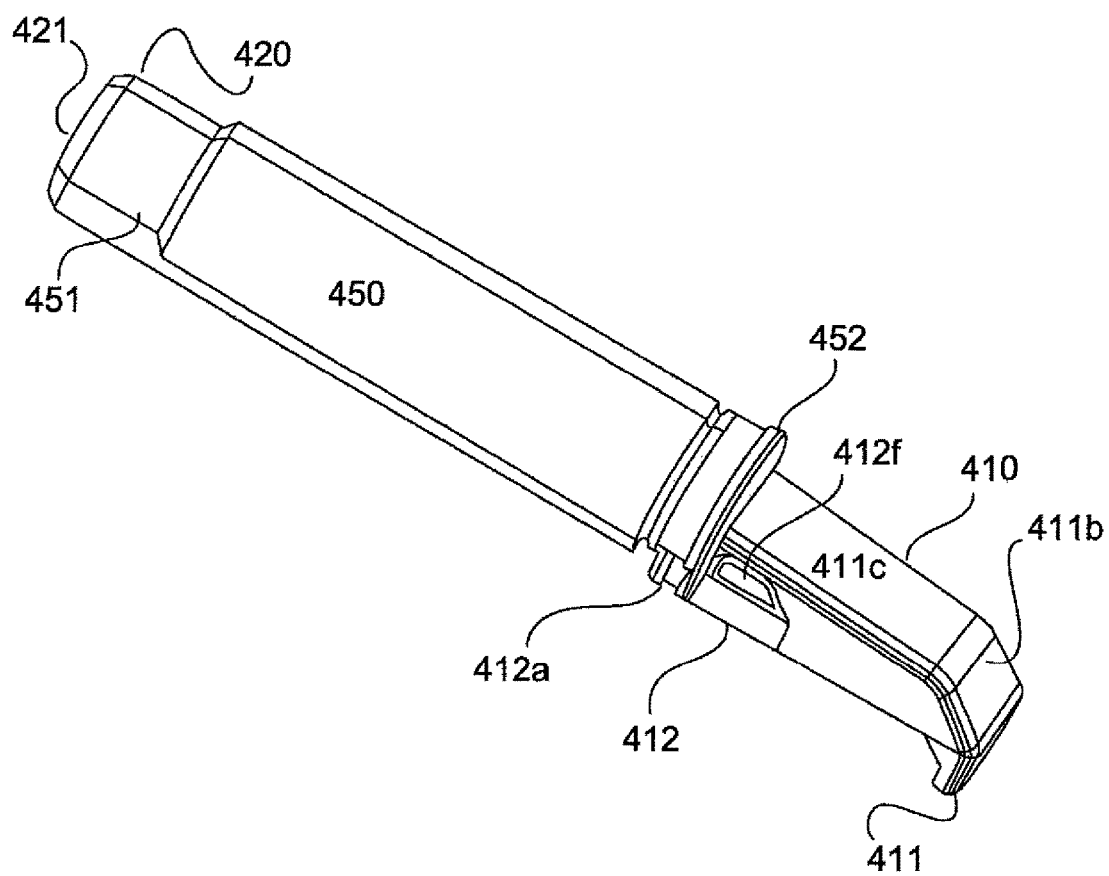
FIGS. 4A-4H show various views of a rechargeable battery for the wireless microphone of FIG. 3A-3D according to a fourth embodiment.
Figure 4B:
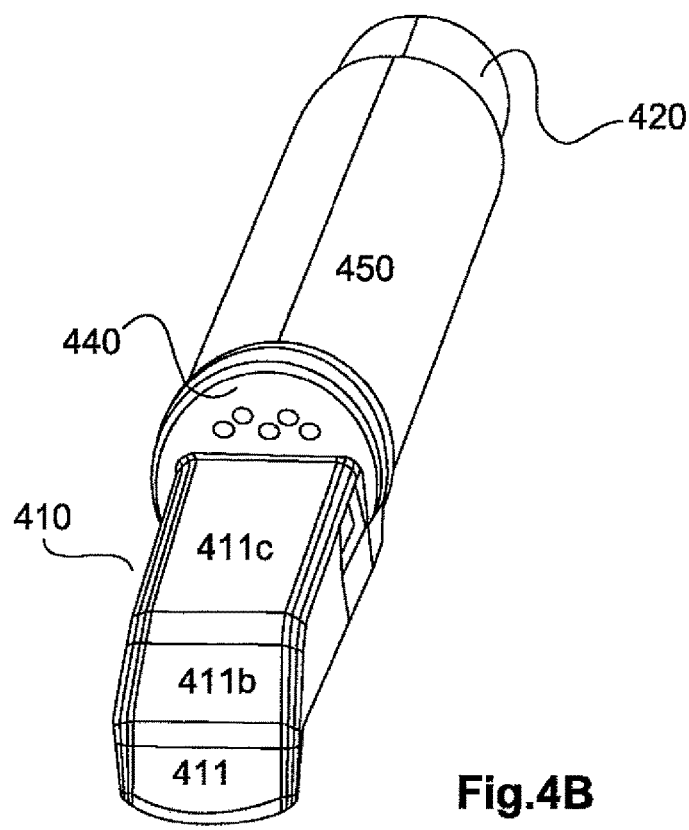
Figure 4C:
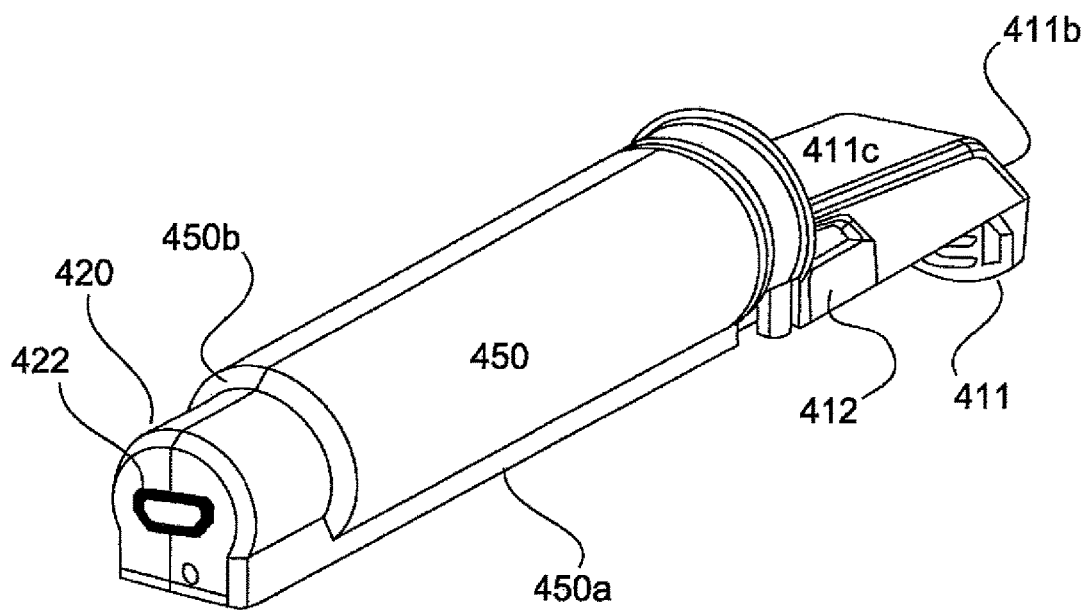
Figure 4D:
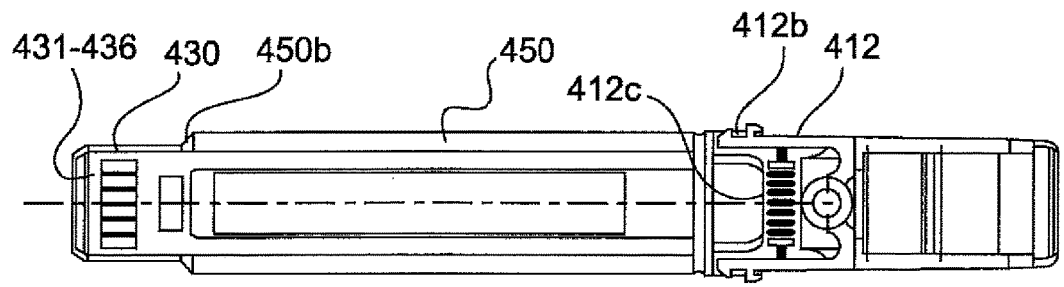
Figure 4E:
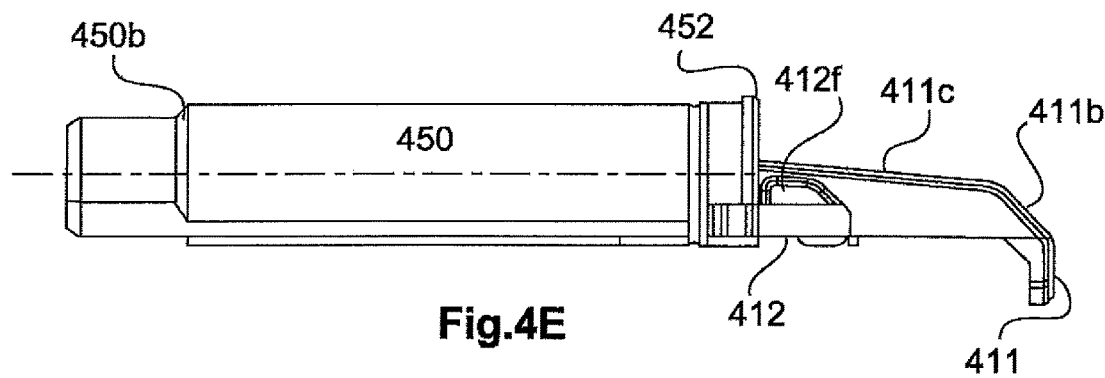
Figure 4F:
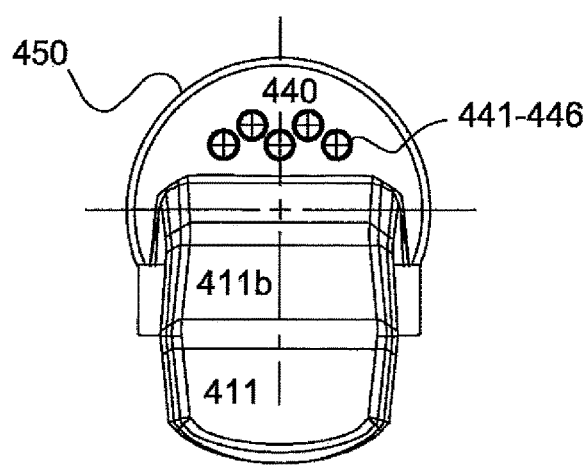
Figure 4G:
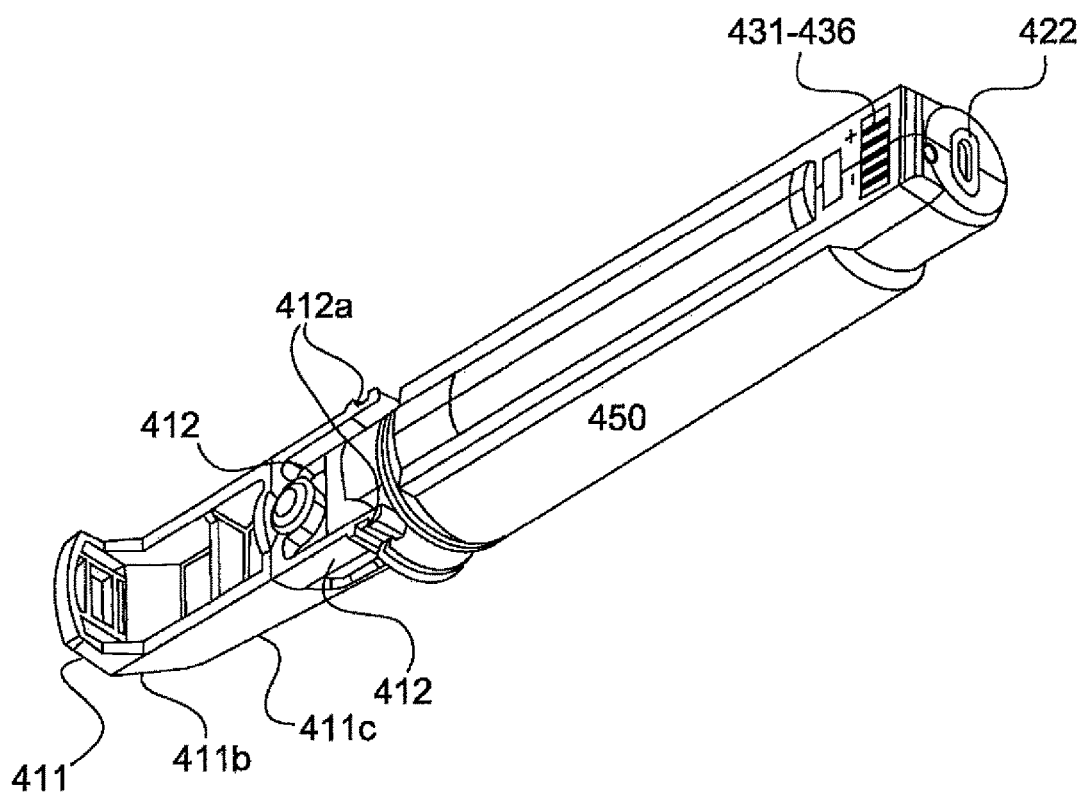
Figure 4H:
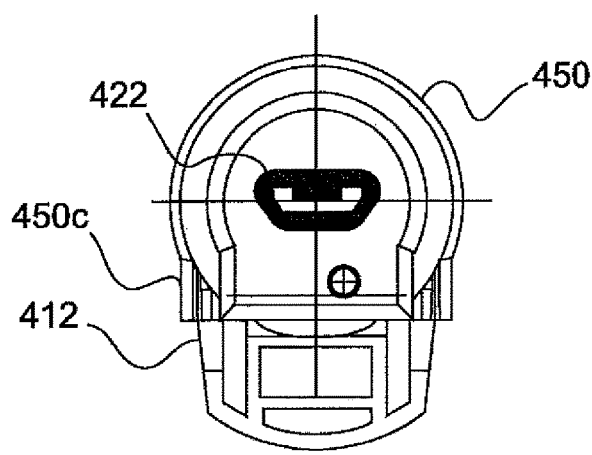

FIGS. 1J and 1H each show the pocket transmitter 100 without rechargeable battery 200.

The pocket transmitter 100 has two side surfaces 170 which at their inside and downwards have two projections 171 so that a passage 172 is provided between the two projections 171 (see FIG. 1J). That passage 172 is adapted to the projection 250 so that the rechargeable battery 200 is inserted from below, in which case the projection 250 can be introduced at both sides into the passage 172 on both sides. When the latching hooks 174 are latched into the recesses 240 then the rechargeable battery 200 is securely fixed and the projection 250 lies securely in the passage 172 so that tipping of the rechargeable battery can be avoided. In addition the configuration of the projection 112, that engages into the recess 270 on the upper front side of the rechargeable battery, can prevent the rechargeable battery from being able to tip outwardly. Provided on the sides 170 at the inside surface is a projection 173 in the form of a ramp (see FIG. 1J). The spacing between the projection 250 and the side surface 200*f*, 200*e* is so adapted that upon being introduced the rechargeable battery bears on the upper end 175 of the side surface.

The pocket transmitter also has on its front side a bevel 100*a* which is matched to the bevel 291 on the rechargeable battery.

The latching hooks 174 can be actuated by the elements 113.

To fit the rechargeable battery 200 in the receiving compartment 101 of the pocket transmitter 100 the rechargeable battery 200 is placed with its rear side 200*b* on the projection 122 (which projects beyond the side walls 170 of the receiving compartment 101). In that way the rechargeable battery 200 is already aligned for insertion into the receiving compartment 101 so that the rechargeable battery 200 is merely pushed in the direction of the latching hooks 174 or the electrical contacts 180. In that case the two projections 250 are fitted into the passage 172 between the two projections. The projection 250 then remains in the passage 172 between the guides 171 so that the rechargeable battery 200 is fitted fixedly in the receiving compartment 101.

In that way the rechargeable battery is firstly aligned by being placed on the projection 122 and is inserted in a direction of movement or in a direction into the receiving compartment 101, in which case the rechargeable battery 200 has to be pushed in the direction of the electrical contacts 180 over the full length defined by the spacing between the step 282 and the top side 200c.

As an alternative thereto the rechargeable battery 200 can be placed from above in the upwardly open receiving compartment 101 and then introduced in the direction of the latching hooks 174 or the electrical contacts 180 completely into the receiving compartment 101 until it optionally comes into latching engagement with the latching hooks 174. In that case insertion of the rechargeable battery 200 into the receiving compartment 101 takes place in two directions of movement, more specifically firstly downwardly into the receiving compartment and then parallel to the receiving compartment or in the direction of the electrical contacts 180. For that purpose the projections 250 extend in their length from the step 282 in the direction of the top side 200c preferably at a maximum of 50% of the distance defined by the spacing between the step 282 and the top side 200c. Insertion of the rechargeable battery 200 is simplified by the restricted length of the projections 250 as the movement of the rechargeable battery 200 in the direction of the electrical contacts 180 no longer has to be performed over the full length defined by the spacing between the step 282 and the top side 200c, but only over the length of the projections 250. The length of the projections 250 can be in the range of between 10% and 80% of the distance from the step 282 to the top side 200c. The projections 250 begin at the step 282.

According to the invention the rechargeable battery 200 can be placed in the projection-free region in the receiving compartment 101 so that the recesses 260 rest against the side walls 170. The side walls 170 also serve to hold the rechargeable battery 200 securely in the receiving compartment 101.1

According to the invention the rechargeable battery 200 has the recess 270 which cooperates with the projection 112 (the recess 270 is adapted to the projection 112) so that the rechargeable battery 200 can be securely placed in the receiving compartment 101. The projection 112 which engages into the recess 270 can ensure that the rechargeable battery 200 which is disposed in the receiving compartment 101 cannot tip outwardly or be readily removed.

According to the invention the rechargeable battery unit 200 is securely held in the receiving compartment 101 by means of the latching hooks 174, the projection 112 and the guides 171 (with the passage 172).

In addition the projection 280 (and the portion 282 of the projection 280 on the left and right sides 200e, 200f) serves to improve the fit of the rechargeable battery in the pocket transmitter.

FIGS. 3A-3E show various views of a wireless microphone according to a third embodiment. The microphone 300 has a microphone head 310, a microphone handle 320 and an end 330. Provided at the end 330 is a projection which can engage into the element 411a and thus securely hold the end 411 of the rechargeable battery.

FIGS. 4A-4H show various views of a rechargeable battery for the wireless microphone of FIGS. 3A-3D. The rechargeable battery 400 has a first end 410 having an inclined portion 411, 411b, a straight portion 411c and a release unit 412 having two latching hooks 412a or a recess 412b and a spring 412c which urges the two latching hooks 412 outwardly. Provided above the release unit 412 is a respective recess 412f which makes it possible for the elements 412 to be pressed together. The rechargeable battery 400 can be removed from the housing 320 by pressing the elements 412 together. For that purpose the housing 320 has a recess into which the hooks 412b can engage.

At its second end 420 the rechargeable battery 400 has a USB jack or a USB charging port 422 to permit charging of the rechargeable battery 400 by way of a USB port. In addition there are six electrical charging contacts 430, 431-436. The rechargeable battery 400 has a central portion 450 which is round in cross-section between the 4 o'clock position and the 8 o'clock position—in the counter-clockwise direction. In addition there is provided the portion 450a between the 4 o'clock position and the 8 o'clock position in the clockwise direction, which is not round. In addition the portions 450b and 451 are provided at the second end 420. The arrangement also has the corners 450c and the rounded portion 450d.

Electrical charging contacts 440 are provided at a first end 452 of the central portion 450. In particular there are five charging contacts 441-46. The rechargeable battery 400 can be charged in the charging unit described with reference to FIGS. 7A-7G by those charging contacts.

The USB charging port 422 is provided at the second end 420 or at the end face 421 of the second end 420. Provided on the underside of the second end 420 is an electrical contact unit 430 with six electrical connections 431-436.

FIGS. 5A-5G show various views of a charging unit according to a seventh embodiment. The charging unit 1000 has at least one charging shaft 1100. The charging shaft 1100 has a first portion 1110, a second portion 1120 (a bevel), a third portion 1130, a fourth portion 1140 (a bevel), a fifth portion 1150, a sixth portion 1160, a seventh portion 1170, an eighth portion 1180, a ninth portion 1190, a tenth portion 1200, an eleventh portion 1210 and a twelfth portion 1220. The first and fifth portions 1110, 1150 are arranged parallel to each other. The sixth and twelfth portions 1160, 1122 are also arranged parallel to the third portion 1130. In addition the eighth portion 1180 and the tenth portion 1200 are arranged parallel to the third portion 1130. The ninth portion 1190 is of an at least portion-wise round arrangement. Optionally provided in the shaft 1100 are two latching hooks 1400, two projections 1500 and a first bottom 1700, optionally with two projections 1710. The two projections 1500 are provided in the region of the seventh and eighth portions 1170, 1180 and in the region of the tenth and eleventh portions 1200, 1210. The first bottom 1700 is enclosed by the first portion, the second portion, the third portion, the fourth portion and the fifth portion 1110-1150.

A respective inclined surface 1800 is provided on both sides between the portion 1500 and the bottom 1700. An inclined surface 1720 can optionally be provided between the first portion 1110 and the first bottom 1700. A second shaft 1600 is provided in the region of the ninth portion 1190.

The charging unit or charging tray 1000 is of such a configuration that it has at least a shaft portion 1002 for receiving a wireless microphone and a shaft portion 1001 for receiving a pocket transmitter with rechargeable battery. Provided in the shaft is a first shaft portion 1001 for receiving the pocket transmitter. Here, provided on both sides is a latching hook 1400 which respectively engages into a recess 290 at or in a side surface of the rechargeable battery 200 of the pocket transmitter in order to be able to securely hold the pocket transmitter 200 in the shaft. If the pocket transmitter 200 with the rechargeable battery 300 is to be removed from the shaft then firstly it is necessary to overcome the resistance produced by the latching hook 1400 which engages into the recess 290.

At its first end the shaft has a bevel 1120, 1140 adapted to the bevel 291. That bevel 291 extends on the side 200a and extends on the side 200f, 200d, 200e. Provided in the first shaft portion are three electrical contacts 1300, 1301-1303 which can be spring-mounted. Those three electrical contacts 1301-1303 contact three of the five electrical contacts 211-215 at the underside 200d of the rechargeable battery 200. At its upper side 200c the rechargeable battery 200 has six contacts 231-236.

Provided in the first shaft portion 1001 is a bottom 1700 in or at which the three spring-mounted electrical contacts are provided.

On its rear side the pocket transmitter 100 has a fixing bow 140. Provided in the first shaft are two recesses 1500 in the region of the tenth and eleventh portions 1200, 1210 and in the region of the seventh and eighth portions 1170, 1180. If the pocket transmitter is introduced with the bow 140 then the bow 140 can be in contact in the two recesses 1500. Provided in the lower region of that recess at the left and the right is a projection 1500 which ends approximately at the level where the bow 140 also ends when the pocket transmitter is placed in the shaft. At their inside those two projections 1500 each have a recess 1520 in the form of a segment of a circle. Provided at the second end of the shaft is a recess 1191 adapted to the housing of the wireless microphone. Provided at the left and the right on the recess there is firstly an inclined surface 1510 which is then followed by a straight portion 1520. The side where the three contacts 1300 are provided is firstly straight and provided in the lower region is an inclined surface 1600. Only a region which is of a configuration in the form of a segment of a circle towards the second end is straight. The portion in the form of a segment of a circle goes into the inclined surface 1510 at the left and at the right. The inclined surface 1510 extends from the end where the electrical contacts are provided as far as the recess in the form of a segment of a circle on the second side where the microphone is placed. Optionally there can be guides in the recess in the form of a segment of a circle.

In the region of the first shaft for the pocket transmitter the left and right sides are of a round configuration at the bottom and each have an elongate projection. The underside of the pocket transmitter or the rechargeable battery is placed on those two elongate projections so that the spring-mounted electrical pins can engage into the electrical contacts of the rechargeable battery. Those two elongate projections can compensate for the spacing between the electrical contacts 211-215 and the underside 200d.

The three electrical spring-supported contacts also serve for electrical contacting of the rechargeable battery of the wireless microphone of the pocket transmitter. The rechargeable battery 400 has five contacts 440 at its underside, wherein three of those contacts can be contacted by the electrical pins of the electrical contacts 1300 to charge the rechargeable battery. Accordingly the electrical (charging) contacts 1300 represent common (charging) contacts both for the wireless microphone and also for the pocket transmitter. Therefore only one of the two can be charged in the charging shaft.

Provided on the left and the right in regard to the shaft for the microphone are introduction or alignment inclined surfaces which serve for introduction and alignment of the microphone so that the microphone is correctly introduced and aligned so that the three pins come into contact with the correct ones of the five contacts.

In addition there are two shoulders on which the bow 140 can rest when the pocket transmitter is introduced. The bottom of the recess is adapted to the end 411 of the rechargeable battery unit. An end inclined surface or base inclined surface respectively is provided in the region of the bottom of the recess.

The configuration of the inclined surfaces forces the microphone to be adapted to be aligned upon insertion in such a way that the three electrical pins come into contact with the corresponding electrical contacts of the rechargeable battery.

Figure 5A:
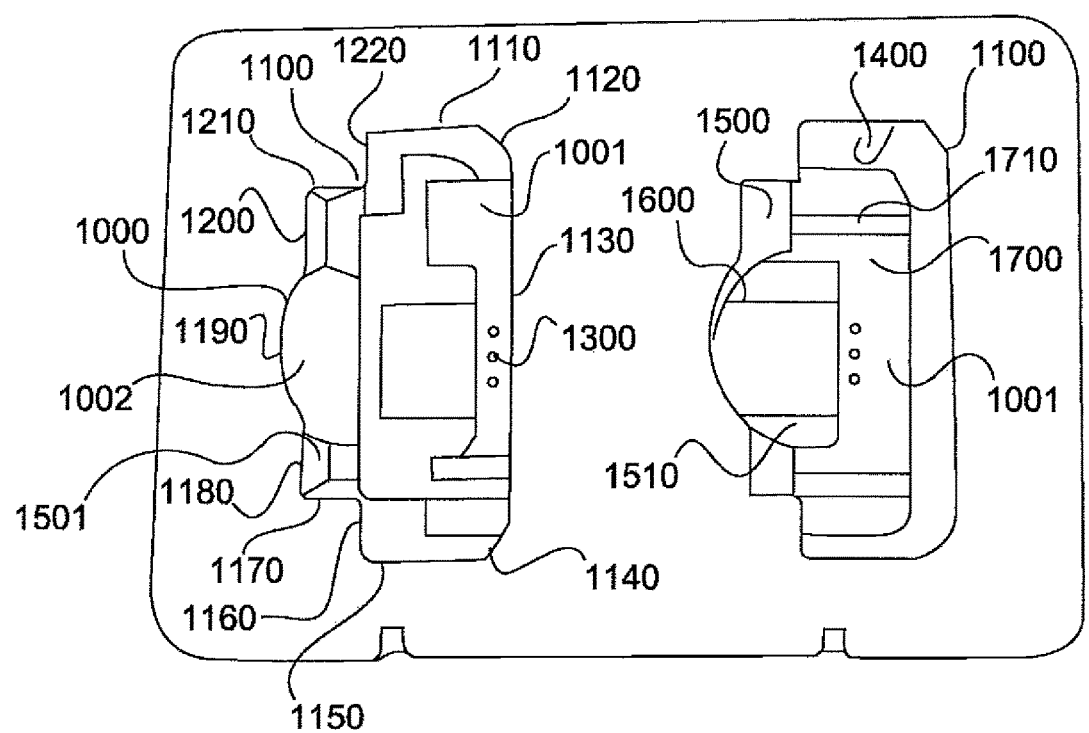
FIGS. 5A-5G show various views of a charging unit according to a fifth embodiment.
Figure 5B:
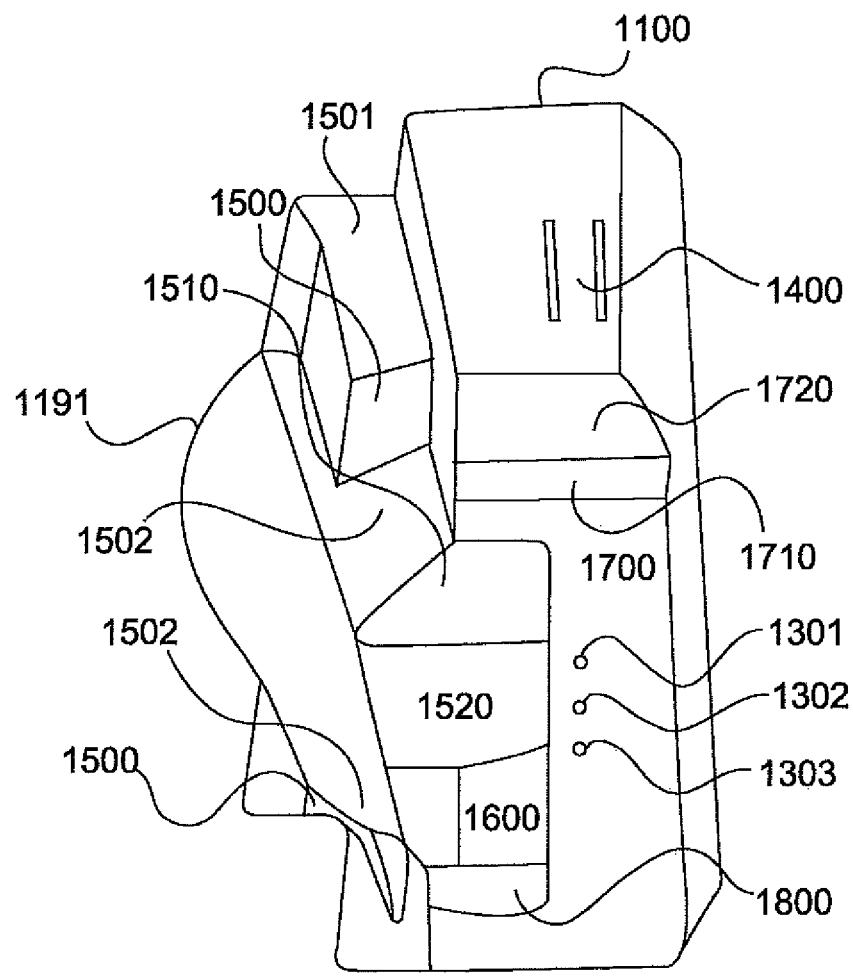
Figure 5C:
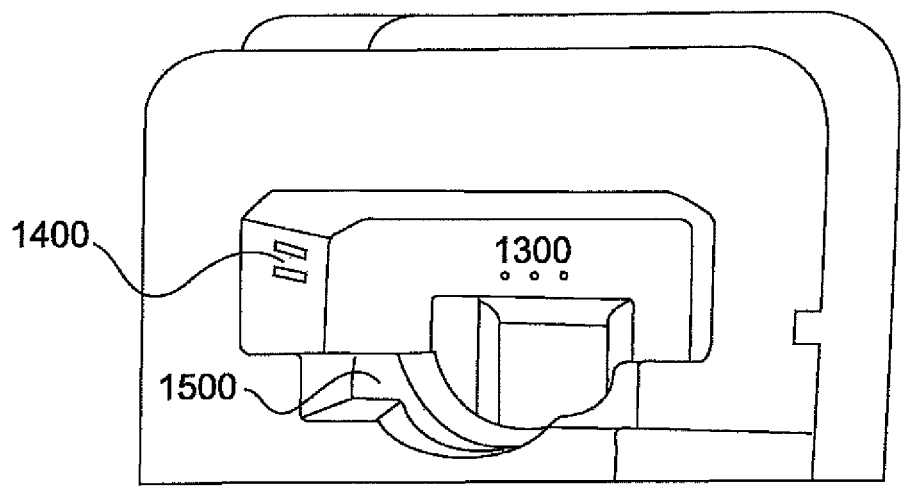
Figure 5D:
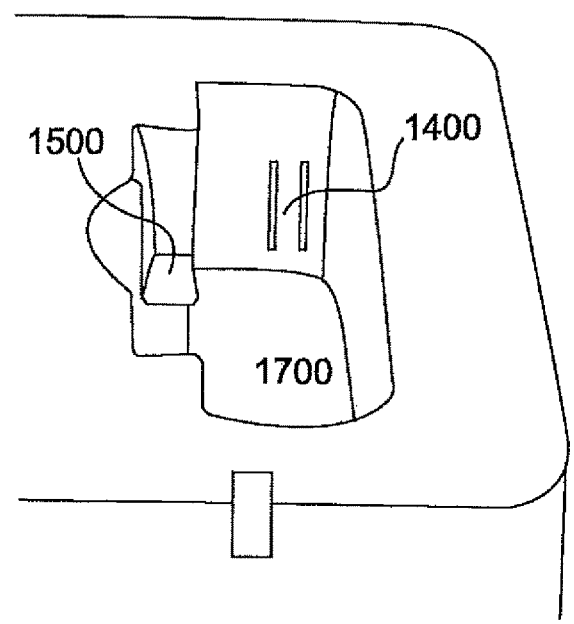
Figure 5E:
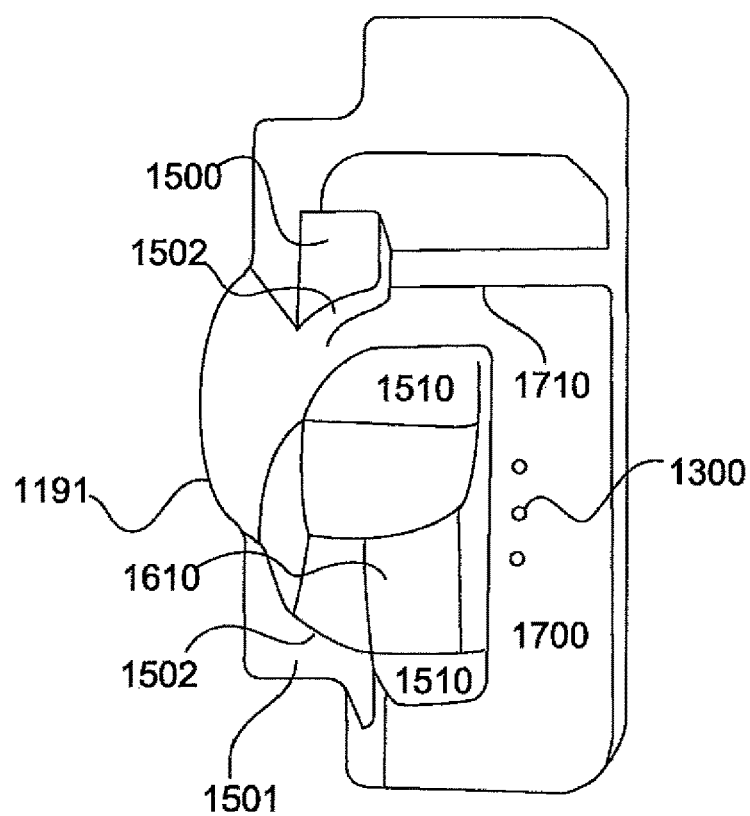
Figure 5F:
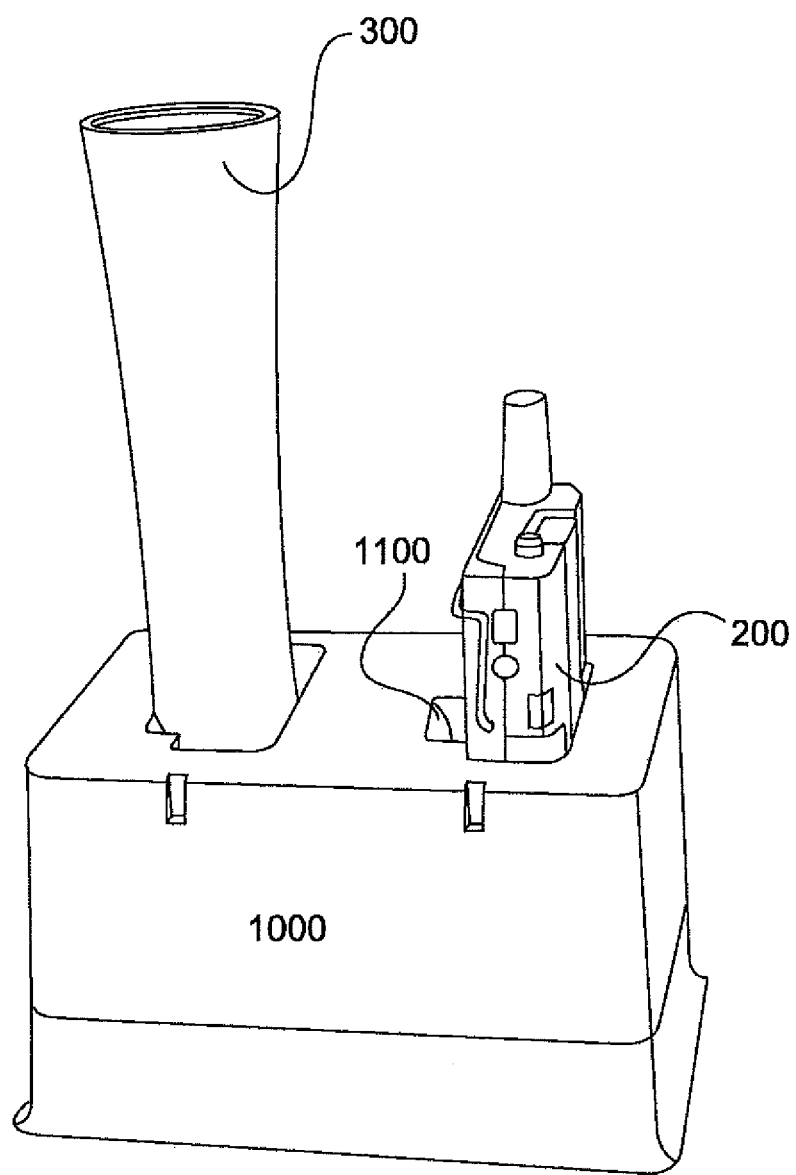
Figure 5G:
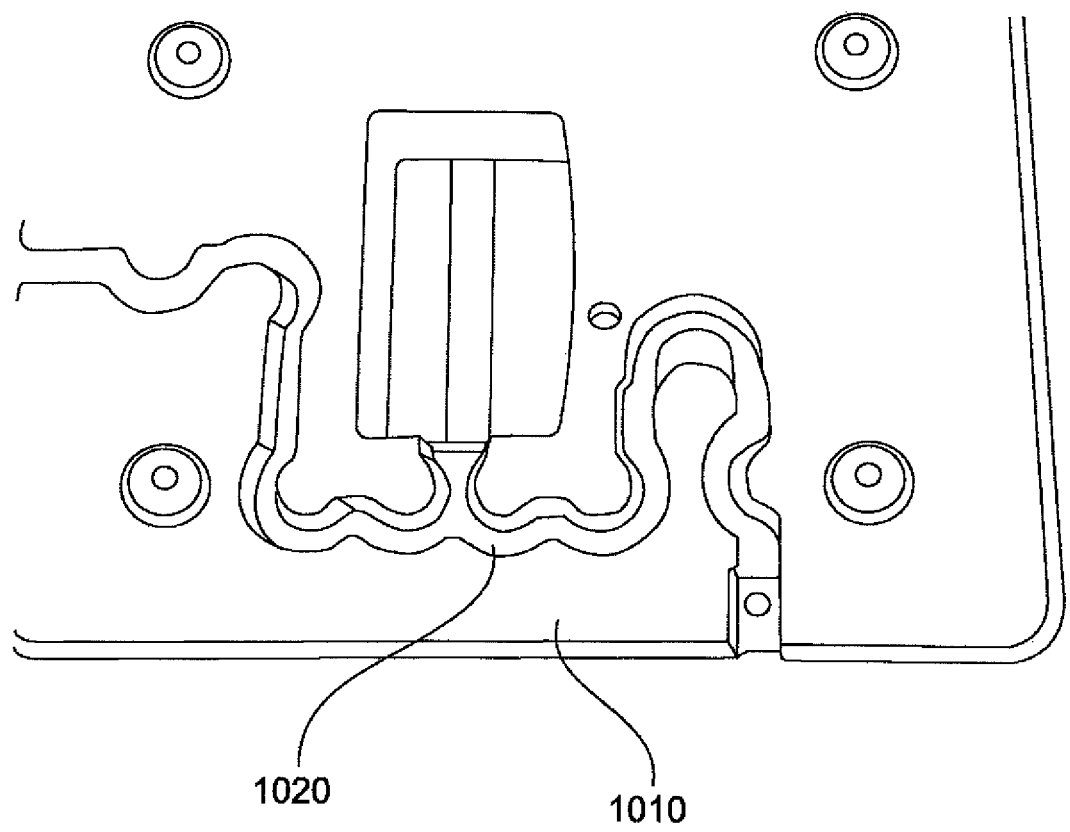

FIG. 5G shows the underside 1010 of the charging unit 1000 with a cable guide 1020. The cable guide 1020 permits an electrical connecting cable to be guided therein from two sides of the charging unit.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A wireless pocket transmitter comprising:
an audio input configured to receive an audio signal;
an antenna configured to wirelessly transmit an audio signal received by way of the audio input;
a rear side;
a front side opposite to the rear side and facing a front direction;
a top side facing a top direction; and
a receiving compartment arranged at the front side and being configured to receive a rechargeable battery, the receiving compartment having:
a rear wall that at least partially forms part of the rear side;
two side surfaces arranged at opposite ends of the rear wall; and
a connecting portion with electrical contacts arranged between the two side surfaces;
wherein each of the two side surfaces is coupled at a first end thereof to the connecting portion;
wherein each of the side surfaces has a second end that has a respective guide configured to guide the rechargeable battery into the receiving compartment;
wherein each guide does not extend along the entire length of its respective side surface, and has two projections and a passage therebetween; and
wherein the front side comprises a projection extending into the receiving compartment and substantially parallel to the rear wall, the projection being configured to engage a top front side of the rechargeable battery facing the top direction and the front direction when placed into the receiving compartment.

2. The wireless pocket transmitter as set forth in claim 1; wherein each first end of the side surfaces has a respective ramp.

3. The wireless pocket transmitter as set forth in claim 1; wherein each of the side surfaces has a second side that is opposite to the first side, each second side having a support surface configured to support the rechargeable battery when the rechargeable battery is arranged in the receiving compartment.

4. The wireless pocket transmitter as set forth in claim 1;
wherein the connecting portion has a projection extending substantially parallel to the rear wall.

5. The wireless pocket transmitter as set forth in claim 1;
wherein the rear wall has an insertion aid or introduction aid in the form of a projection.

6. A method comprising:
utilizing a rechargeable battery unit in the wireless pocket transmitter as set forth in claim 1;
wherein the rechargeable battery unit comprises:
a front side as an outward surface;
a rear side opposite to the front side;
a left and a right side;
a top side comprising electrical contacts;
an underside opposite to the topside;
a first projection in the region of the underside and along the rear side, and at least partially along the left and right sides;
a respective recess at each of the right and left sides towards the rear side; and
a respective projection in each of the two recesses, each respective projection being connected at a first end thereof to the first projection and extending partially along the recess; and
wherein an upper surface of the front side of the rechargeable battery unit comprises a recess configured to engage the projection at the front side of the wireless pocket transmitter.

7. The wireless pocket transmitter as set forth in claim 1;
wherein the rear wall has a projection that extends beyond the second ends of the two side surfaces;
wherein the connecting portion has two latching projections configured to securely hold the rechargeable battery when arranged in the receiving compartment.

8. A rechargeable battery unit for a wireless pocket transmitter comprising:
a front side facing a front direction as an outward surface;
a rear side opposite to the front side;
a left side;
a right side opposite to the left side;
a top side facing a top direction and comprising electrical contacts;
an underside opposite to the top side;
a first projection in a region of the underside and along the rear side, and at least partially along the left and right sides;
a respective recess at each of the right and left sides towards the rear side; and
a respective projection in each of the two recesses, each respective projection being connected at a first end thereof to the first projection and extending partially along the recess; and
wherein a top surface of the front side of the rechargeable battery unit facing the top direction comprises a recess configured to engage a projection at a front side of the wireless pocket transmitter facing the Front direction when the rechargeable batter unit is engaged with the wireless pocket transmitter.

9. The rechargeable battery unit as set forth in claim 8;
wherein the underside comprises:
an first electrical charging contact unit; and
a USB charging port.

10. The rechargeable battery unit as set forth in claim 9;
wherein the first electrical charging contact unit has six charging contacts; and
wherein the top side comprises a second electrical charging contact unit having six contacts.

11. The rechargeable battery unit as set forth in claim 8;
wherein the front side comprises a recess.

12. The rechargeable battery unit as set forth in claim 8;
wherein the first projection has a recess in a region of the rear side.

13. The rechargeable battery unit as set forth in claim 8;
wherein the top side has two recesses configured to receive corresponding latching projections of the wireless pocket transmitter so as to securely fix the rechargeable battery to the wireless pocket transmitter.

* * * * *